J. P. BAKER.
GUANO DISTRIBUTERS.
No. 195,327.  Patented Sept. 18, 1877.
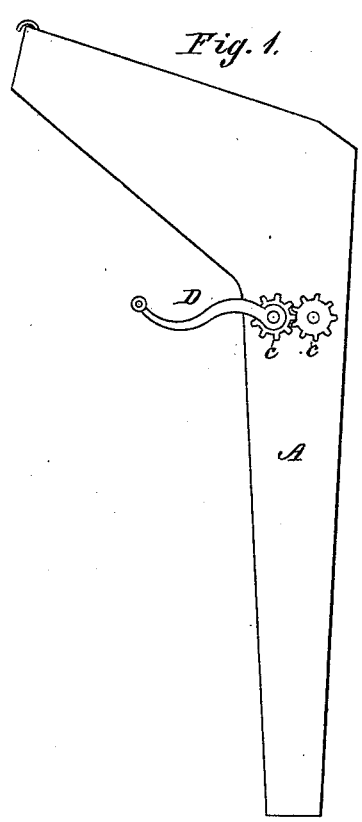
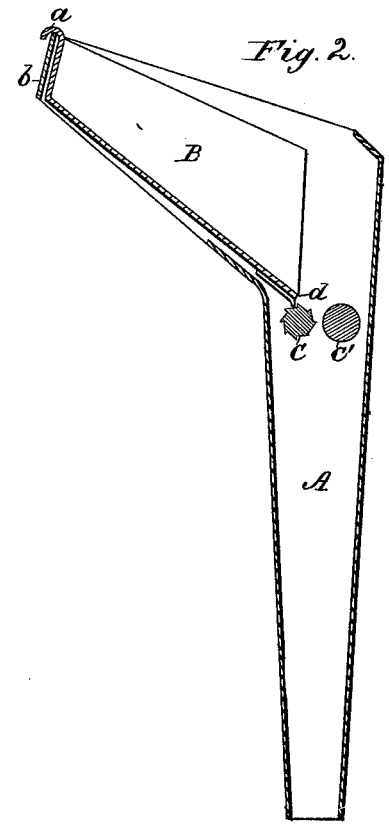
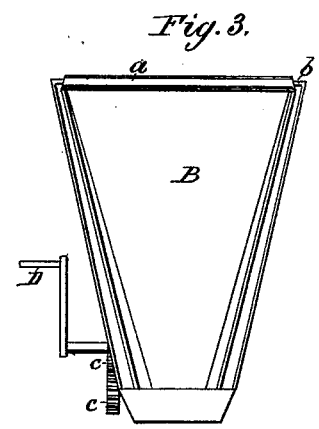
WITNESSES:
INVENTOR:
Joseph P. Baker
BY
ATTORNEYS.

UNITED STATES PATENT OFFICE.

JOSEPH P. BAKER, OF MADISON, GEORGIA.

IMPROVEMENT IN GUANO-DISTRIBUTERS.

Specification forming part of Letters Patent No. 195,327, dated September 18, 1877; application filed August 20, 1877.

*To all whom it may concern:*

Be it known that I, JOSEPH P. BAKER, of Madison, in the county of Morgan and State of Georgia, have invented a new and Improved Guano-Distributer; and I do hereby declare that the following is a full, clear, and exact description of the same, reference being had to the accompanying drawings, forming part of this specification, in which—

Figure 1 is a side view; Fig. 2, a vertical longitudinal section; Fig. 3, a plan view.

My invention relates to an improved device for distributing guano and other similar fertilizers; and it consists in a spout having a flared upper end containing a removable hopper, and having two feed-rollers geared together and operated by a crank. One of the rollers is grooved or fluted, and co-operates both with the hopper to shake it and with the other roller to pulverize and feed the fertilizer, the whole forming a light and convenient portable hand-distributer, as hereinafter more fully described.

In the drawings, A represents the spout, made of sheet metal, with a flared upper end. B is the hopper, which is made with triangular sides, and an inclined bottom opening at the lower end into the vertical portion of the spout. This hopper is made removable, and its rear or higher side is formed with a hooked lip, a, which hooks over the cross-piece b at the upper end of the distributer in such a manner as to permit a shaking motion of the hopper upon the edge of the cross-piece as a pivot.

Just beneath the opened end of the hopper is arranged, in bearings in the spout, two rollers, C C'. These two rollers are geared together outside of the spout by means of cog-wheels c c, and are rotated together by means of the crank D, in order to crush the lumps and feed the fertilizer to the earth.

In order to shake or agitate the contents of the hopper, and thus insure a continuous feed, a lip or extension, d, is formed upon the lower end of the hopper, and is made to rest upon one of the rollers C, which latter is grooved, fluted, or toothed, so that this roller in revolving not only co-operates with the other roller to crush the lumps and feed the fertilizer, but also agitates the hopper and secures therefrom a continuous supply.

The distributer, as thus described, may be made of any desired size and material; but its dimensions are, by preference, about three feet in length from the rollers to the end of the spout, with an average transverse dimension of about four inches square, the hopper having a capacity of about eight or ten quarts.

Among the advantages of the invention may be mentioned the crushing of lumps and the regular distribution of the fertilizer, the quantity sowed being regulated at will. It also avoids the repulsive and unpleasant handling of the guano, and by applying it just where it is wanted saves the loss involved by broadcasting it. The device is also simple, cheap, and not easily deranged.

Having thus described my invention, what I claim as new is—

The fertilizer-distributer consisting of the spout A and the pivoted or hanging hopper B, combined with the rollers C C', one of which is fluted, grooved, or toothed, and arranged to agitate the hopper, substantially as described.

JOSEPH P. BAKER.

Witnesses:
A. K. ACKERMAN,
R. H. C. PASCHALL,
JERRY S. LEAK.